US012720186B2

(12) United States Patent
Shimosato

(10) Patent No.: US 12,720,186 B2
(45) Date of Patent: Aug. 25, 2026

(54) ELECTRONIC APPARATUS CAPABLE OF EASILY REGISTERING SETTING ITEM, METHOD OF CONTROLLING ELECTRONIC APPARATUS, AND STORAGE MEDIUM

(71) Applicant: CANON KABUSHIKI KAISHA, Tokyo (JP)

(72) Inventor: Jiro Shimosato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 18/427,312

(22) Filed: Jan. 30, 2024

(65) Prior Publication Data

US 2024/0267612 A1 Aug. 8, 2024

(30) Foreign Application Priority Data

Feb. 2, 2023 (JP) ................................ 2023-014558

(51) Int. Cl.
*H04N 23/63* (2023.01)
*G06F 3/0482* (2013.01)

(52) U.S. Cl.
CPC ......... *H04N 23/631* (2023.01); *G06F 3/0482* (2013.01)

(58) Field of Classification Search
CPC .... H04N 23/72; H04N 23/632; H04N 23/631; H04N 23/633; H04N 23/65; H04N 23/60; H04N 23/62; G06F 3/0482
USPC .................................................... 348/333.01
See application file for complete search history.

(56) References Cited

U.S. PATENT DOCUMENTS 8,321,802 B2 * 11/2012 Rogers ................ G06F 3/04817 715/845
8,843,853 B1 * 9/2014 Smoak .................... H04L 67/52 715/830
10,254,922 B2 * 4/2019 Watanabe ............ H04N 1/0035
10,739,950 B2 * 8/2020 Watanabe ........... G06F 3/04847
11,650,714 B2 * 5/2023 Abe ...................... G06F 3/0482 715/810
2007/0216965 A1 * 9/2007 Yoshihama ........ H04N 1/00482 358/474
2012/0288264 A1 * 11/2012 Aoyama ................ G03B 13/36 396/121
2013/0111410 A1 * 5/2013 Okada .................. G06F 3/0489 715/841
2015/0026632 A1 * 1/2015 Wakabayashi ......... H04N 23/69 715/776

(Continued)

FOREIGN PATENT DOCUMENTS

JP 2008304984 A 12/2008

*Primary Examiner* — Pritham D Prabhakher
(74) *Attorney, Agent, or Firm* — Canon U.S.A., Inc. IP Division

(57) ABSTRACT

An electronic apparatus capable of registering a setting item with a simple operation. A system controller performs control to display a setting menu screen for displaying a first setting item group or a my-menu screen for displaying a second setting item group which is part of the items of the first setting item group on a liquid crystal monitor. An item is selected from the first setting item group on the setting menu screen. The system controller executes a registration process for registering the selected item in the second setting item group in response to an operation of long pressing a menu button, which is performed during the display of the setting menu screen.

14 Claims, 9 Drawing Sheets

(56) References Cited

U.S. PATENT DOCUMENTS

| | | | | |
|---|---|---|---|---|
| 2016/0077687 | A1* | 3/2016 | Watanabe | G06F 3/0482 715/763 |
| 2019/0179498 | A1* | 6/2019 | Watanabe | G06F 3/0482 |
| 2021/0200392 | A1* | 7/2021 | Abe | G06F 3/0482 |

* cited by examiner

ELECTRONIC APPARATUS CAPABLE OF EASILY REGISTERING SETTING ITEM, METHOD OF CONTROLLING ELECTRONIC APPARATUS, AND STORAGE MEDIUM

BACKGROUND

Field of the Disclosure

The present disclosure relates to an electronic apparatus capable of easily registering a setting item, a method of controlling the electronic apparatus, and a storage medium.

Description of the Related Art

An electronic apparatus, such as a camera, has a lot of setting items to be set. Most of electronic apparatuses display a menu screen for prompting a user to set these setting items by himself/herself. Then, the user selects and sets a desired setting item on the displayed menu screen.

However, in a case where the number of setting items on the menu screen is very large, it is sometimes difficult for a user to find a desired setting item and then set the same. Particularly, as for a setting item which is frequently used, it is troublesome to perform operations for finding and setting the same whenever the setting item is used, which reduces the user friendliness. To address this issue, an electronic apparatus has been proposed which has a "my-menu function" enabling a user to generate his/her favorite menu items by selecting only a desired setting item from setting items displayed on the menu screen and registering the selected setting item in a registration screen. Further, a technique disclosed in Japanese Laid-Open Patent Publication No. 2008-304984 has proposed a function of automatically registering only setting items which are frequently used by a user, in my-menu.

Incidentally, in a case where a user registers a desired setting item in my menu, the user registers the setting item from a my-menu registration screen. However, a list of setting items is displayed on this my-menu registration screen, and the user is required to perform an operation of finding the desired setting item from the display and registering the setting item (performing customization). As a result, there is an issue that the registration operation is very troublesome, causing reduction of the user friendliness.

Further, there is an electronic apparatus having not only a menu, but also a quick setting screen (LVQ) which enables a setting item to be set from a setting screen superimposed on a live view screen. Similar to the my-menu, the quick setting screen also enables a user to register only a desired one of setting items. However, also in this case, the user is required to find a desired setting item from a registration screen of the quick setting screen and then register the selected setting item.

Further, in recent years, a lot of electronic apparatuses each having general Fn (function) buttons are commercially available, and by registering a desired setting item in an Fn button, it is possible to call a menu screen by pressing the Fn button. However, also in this case, the user is required to select a setting item from a registration screen of Fn buttons and register the selected setting item.

As described above, since the registration screen exists for each setting screen, for example, when a user intends to register a desired setting item in my-menu, the quick setting, and the Fn button, respectively, first, the user enters the registration screen in each setting screen. Then, the user is necessarily required to perform the operation of finding a desired setting item and then registering the same, and hence the registration operation is very troublesome and is not user friendly, resulting in a markedly lowered useability. That is, in all of the cases, unless a user has high motivation to search for a setting item (menu item) for customization of the menu, the user cannot register a desired setting item. This is a nuisance to the user.

SUMMARY

Embodiments of the present disclosure provide an electronic apparatus capable of registering a setting item with a simple operation, a method of controlling the electronic apparatus, and a storage medium.

In a first aspect of the present disclosure, there is provided an electronic apparatus including a display controller configured to perform control to display a first display screen for displaying a first setting item group or a second display screen for displaying a second setting item group which is part of items of the first setting item group, on a display, a selection section configured to select an item from the first setting item group on the first display screen, and a controller configured to execute a registration process for registering an item selected by the selection section in the second setting item group in response to a first operation performed during the display of the first display screen.

In a second aspect of the present disclosure, there is provided a method of controlling an electronic apparatus, including performing control to display a first display screen for displaying a first setting item group or a second display screen for displaying a second setting item group which is part of items of the first setting item group on a display, selecting an item from the first setting item group on the first display screen, and executing a registration process for registering an item selected by the selecting in the second setting item group in response to a first operation performed during the display of the first display screen.

According to embodiments of the present disclosure, it is possible to provide an electronic apparatus that is improved in user friendliness by eliminating the need of performing, in a case where a user registers a desired setting item in setting screens or the like, a particular registration operation from the display of each setting screen, a method of controlling the electronic apparatus, and a storage medium.

Further features of the present disclosure will become apparent from the following description of exemplary embodiments (with reference to the attached drawings).

DESCRIPTION OF THE EMBODIMENTS

Embodiments of the present disclosure will now be described in detail below with reference to the accompanying drawings showing embodiments thereof.

An embodiment of the present disclosure will be described in detail below with reference to the accompanying drawings. However, the following description of the configuration of an embodiment is given, only by way of example, and the scope of the present disclosure is not limited to the described configuration of the embodiment. In the following description, an image capturing apparatus (camera 100) will be described as an example of an electronic apparatus.

Figure 1:
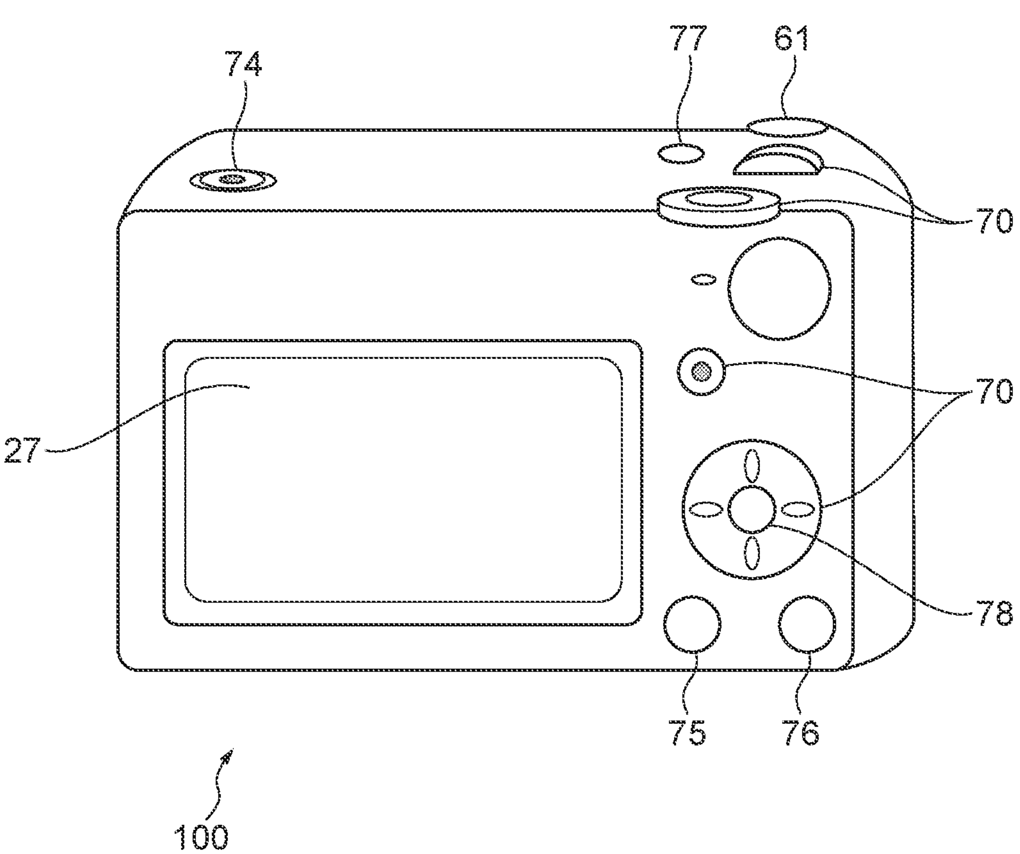
FIG. 1 is an appearance view of an image capturing apparatus (camera) as an electronic apparatus according to an embodiment of the present disclosure.

FIG. 1 shows the appearance of the camera 100 as an example of the electronic apparatus according to the embodiment of the present disclosure. The near side of the drawing is the rear side of the camera 100, and the far side of the drawing is the front side of the camera 100. A liquid crystal monitor 27 (display) is disposed in a central portion on the rear side of the camera 100. The liquid crystal monitor 27 forms a display that displays a captured image, a menu screen, a variety of information, and so forth. A front side portion of a top surface of the camera 100 is provided with a shutter button 61. The shutter button 61 is an operation section for providing an instruction for capturing a still image. A power switch 74 provided on a left side portion of the top surface of the camera 100 is a push button for switching on/off of the power.

A menu button 75 disposed on a lower portion of the rear side of the camera 100 is mainly used to display the menu screen on the liquid crystal monitor 27 by pressing the same. In the present embodiment, by long pressing the menu button 75 on the menu screen, it is possible to register a focused menu item in a my-menu tab, and rearrange the focused menu item of my menu for display. Note that in this specification, a state in which a main tab or sub tab, or a setting item is "selected" is also described as "focused" or "being focused".

A Q button 76 provided on the right side of the menu button 75 is mainly used to display a quick setting screen for a captured image or a reproduced image, on the liquid crystal monitor 27. A My-Fn button 77 provided on a right side portion of the top surface of the camera body is used to customize a setting item according to the user's favorite. When the My-Fn button 77 is pressed, the display and function of a setting screen are invoked according to a function allocated to the My-Fn button 77 by customization. A set button 78 is mainly used to change or determine a setting. Although details are described hereinafter, an operation section 70 provided on the rear surface and the top surface of the camera 100 is operating means for inputting a variety of operation instructions to a system controller 50.

Figure 2:
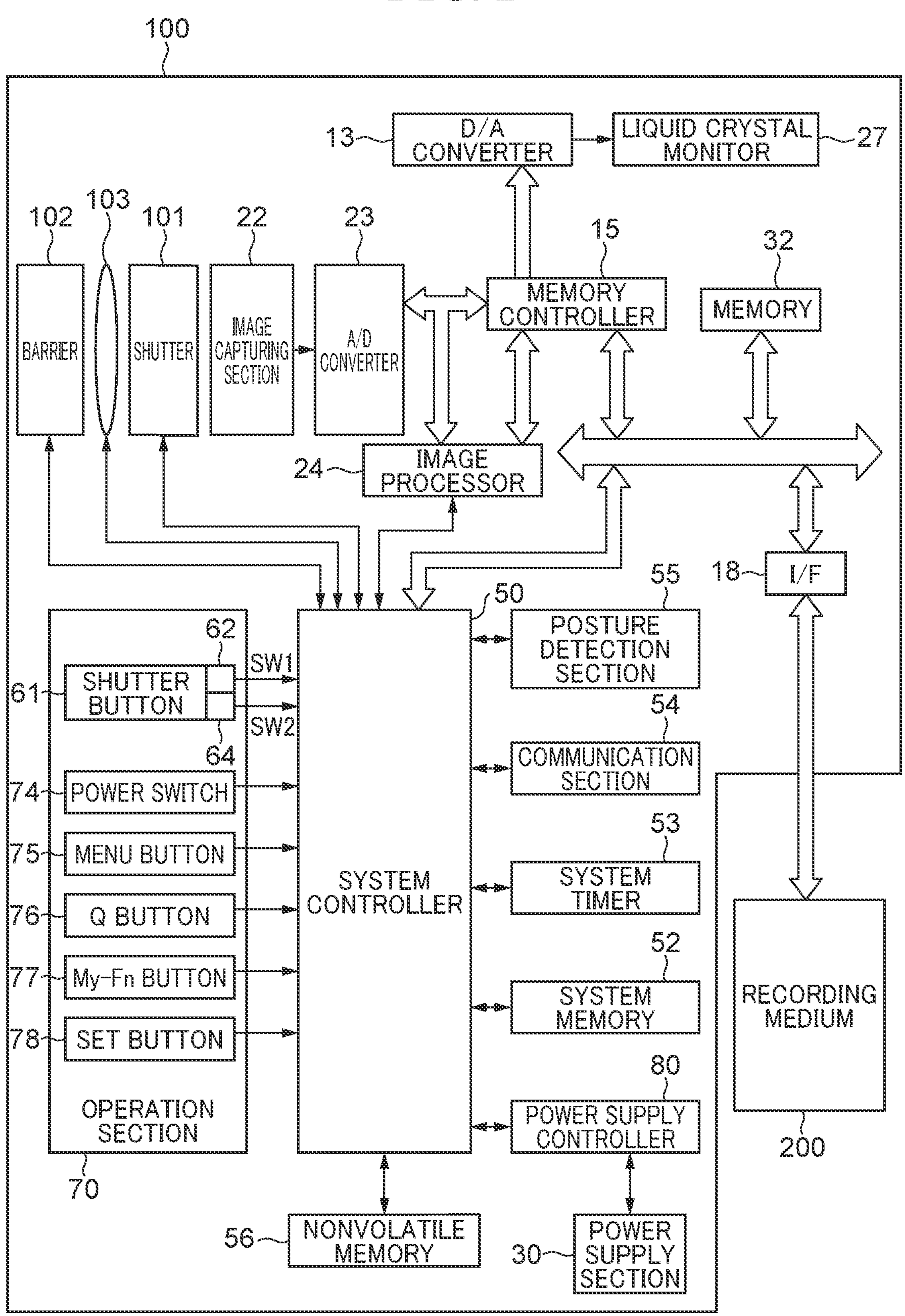
FIG. 2 is a block diagram of a camera body of the embodiment of the present disclosure.

FIG. 2 is a block diagram of the camera 100. The camera 100 has an image capturing system. The image capturing system includes a barrier 102, an image capturing lens 103, a shutter 101, an image capturing section 22, and an analog-to-digital (A/D) converter 23. The barrier 102 covers the image capturing system, which includes the image capturing lens 103, of the camera 100 to thereby prevent the image capturing system including the image capturing lens 103, the shutter 101, and the image capturing section 22 from being soiled and damaged. The image capturing lens 103 is a lens group including a zoom lens and a focus lens. The shutter 101 is a device having an aperture function. The image capturing section 22 is an image sensor implemented, for example, by a CCD or CMOS device that converts an optical image of an object to electrical signals. The A/D converter 23 converts analog signals output from the image capturing section 22 to digital signals.

The digital signals output from the A/D converter 23 are supplied to an image processor 24, a memory controller 15, and so forth. The image processor 24 performs predetermined pixel interpolation, resizing, such as size reduction, and color conversion processing, on data received from the A/D converter 23 or data received from the memory controller 15. Further, the image processor 24 performs predetermined calculation processing using captured image data, and the system controller 50 performs exposure control and ranging control based on results obtained by the calculation processing. With this, through-the-lens (TTL) auto-focus (AF) processing, auto-exposure (AE) processing, flash pre-emission (EF) processing, and so forth are performed. The image processor 24 further performs predetermined calculation processing using captured image data, and also performs TTL auto white balance (AWB) processing based on a result obtained by the calculation processing.

The digital signals output from the A/D converter 23 are written into a memory 32 via the image processor 24 and the memory controller 15 or via the memory controller 15. The memory 32 stores image data which is obtained by the image capturing section 22 and converted by the A/D converter 23 from analog to digital and image data which is to be displayed on the liquid crystal monitor 27. The memory 32 has a sufficient storage capacity to store a predetermined number of still images and a predetermined time period of moving images and sounds.

Further, the memory 32 also functions as a memory (video memory) for image display. A digital-to-analog (D/A) converter 13 is disposed between the memory controller 15 and the liquid crystal monitor 27. The D/A converter 13 converts the data for image display, which is stored in the memory 32, to analog signals via the memory controller 15 and supplies the converted analog signals to the liquid crystal monitor 27. Thus, the image data for display, which is written in the memory 32, is displayed by the liquid crystal monitor 27 via the D/A converter 13. The liquid crystal monitor 27 performs display corresponding to the analog signals supplied from the D/A converter 13 on a display device, such as a liquid crystal display (LCD). The digital signals once converted by the A/D converter 23 and stored in the memory 32 are converted again to analog signals by the D/A converter 13 and sequentially transferred to and displayed on the liquid crystal monitor 27, whereby it is possible to display the through image (live view display).

A nonvolatile memory 56 is an electrically erasable and recordable recording medium, and, for example, an Electrically Erasable Programmable Read-Only Memory (EEPROM) or the like is used therefor. The nonvolatile memory 56 is connected to the system controller 50 and stores, for example, constants and programs for the operation of the system controller 50. Here, the programs refers to computer programs for executing a variety of processes, described hereinafter, in the present embodiment.

The system controller 50 controls the overall operation of the camera 100. By executing the programs recorded in the above-mentioned nonvolatile memory 56, it is possible to realize the processes, described hereinafter, in the present embodiment. The processes, described hereinafter with reference to FIGS. 4 to 7, are realized by the system controller 50 that reads the programs recorded in the nonvolatile memory 56 to thereby perform a variety of calculation processing operations and control the components based on the loaded programs. To the system controller 50, a system memory 52, a system timer 53, a communication section 54, and a posture detection section 55 are connected. As the system memory 52, for example, a Random Access Memory (RAM) is used. In the system memory 52, there are loaded the constants and variables for the operation of the system controller 50, the programs read out from the nonvolatile memory 56, and so forth. Further, the system controller 50 also has a function of performing display control by controlling the memory 32, the D/A converter 13, and so forth. The system timer 53 is a time counter for measuring time used for a variety of controls and time of incorporated clocks.

The communication section 54 is communicably connected to an external apparatus by using wireless or wired connection to transmit and receive video signals, voice signals, and the like. The communication section 54 can also be connected to a wireless Local Area Network (LAN) and the Internet. The communication section 54 can transmit an image (including the through image) captured by the image capturing section 22 and an image recorded in a recording medium 200 connected to the system controller 50 via an interface (I/F) 18. Further, the communication section 54 can receive image data and a variety of other information from an external apparatus. The recording medium 200 is a memory card or the like for recording a captured image and is implemented by a semiconductor memory, an optical disk, a magnetic disk, or the like.

The posture detection section 55 detects a posture of the camera 100 with respect to a gravity direction. Whether an image captured by the image capturing section 22 is an image captured in a state in which the camera 100 is laterally held or an image captured in a state in which the camera 100 is vertically held can be determined based on a posture detected by the posture detection section 55. The system controller 50 can attach orientation information associated with the posture detected by the posture detection section 55 to an image file of an image captured by the image capturing section 22, or record an image after rotation. The posture detection section 55 is, for example, an acceleration sensor or a gyro sensor.

Further, the system controller 50 (a display controller, a controller, and a selection section) is connected to the operation section 70. The operation section 70 includes the shutter button 61, the power switch 74, the menu button 75, the Q button 76, the My-Fn button 77, the set button 78, and so forth. The operation section 70 is operating means for inputting a variety of operation instructions to the system controller 50 and includes various types of buttons (operation elements). Note that the menu button 75, the Q button 76, the My-Fn button 77, and the set button 78 will be specifically described hereinafter.

The shutter button 61 includes a first shutter switch 62 and a second shutter switch 64. The first shutter switch 62 is turned on when the shutter button 61 provided on the camera 100 is brought to a half-pressed state, i.e. turned on by a so-called half operation (shooting preparation instruction) to generate a first shutter switch signal “SW1”. Upon receipt of the first shutter switch signal SW1, the system controller 50 starts the operations of the AF processing), the AE processing, the AWB processing, the EF processing, and so forth. On the other hand, the second shutter switch 64 is turned on when the shutter button 61 is brought to a fully pressed state, i.e. turned on by a so-called complete operation (shooting instruction) to generate a second shutter switch signal “SW2”. Upon reception of the second shutter switch signal “SW2”, the system controller 50 starts a series of photographing processing operations from an operation of reading out signals from the image capturing section 22 to an operation of writing image data into the recording medium 200.

Each operation element of the operation section 70 has a function assigned thereto, as required, which is activated, on an operating situation basis, when a user selects and operates an associated one of a variety of function icons displayed on the liquid crystal monitor 27 (display), to thereby function as one of a variety of function buttons. Examples of the function buttons include an “end button”, a “return button”, an “image scroll button”, a “jump button”, a “narrowing button”, and an “attribute change button”. For example, when the menu button 75 is pressed, a menu screen on which a variety of settings can be made is displayed, for example, on the liquid crystal monitor 27. The user can intuitively perform the variety of settings by using the menu screen displayed on the liquid crystal monitor 27 and four-direction buttons of upper, lower, right, and left directions and the set button 78.

A power supply controller 80 connected to the system controller 50 is comprised of a battery detection circuit, a DC-DC converter, and a switch circuit for switching blocks to be energized, and detects, for example, attachment or non-attachment of a battery, a type of the battery, and a battery remaining amount. Further, based on a result of the detection and an instruction from the system controller 50, the power supply controller 80 controls the DC-DC converter to supply a required voltage to components requiring voltage supply, including the recording medium 200, for a required time period. A power supply section 30 connected to and controlled by the power supply controller 80 is comprised of a primary battery, such as an alkaline battery or a lithium battery, or a secondary battery, such as an NiCd battery, an NiMH battery, or an Li battery, and an AC adapter.

Figure 3A:
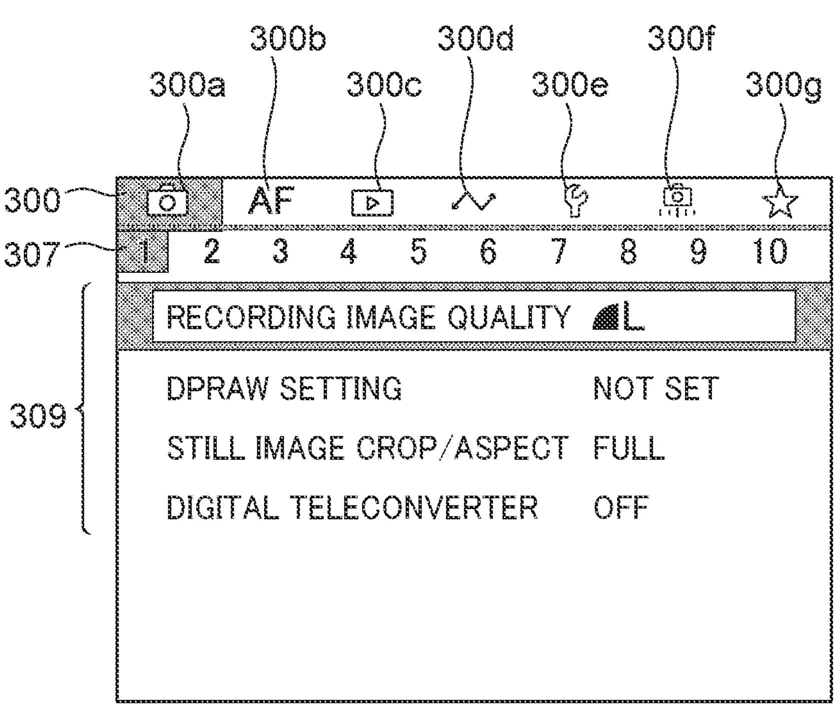
FIGS. 3A to 3F are diagrams each showing an example of a menu screen displayed on a liquid crystal monitor of the camera body of the embodiment of the present disclosure.
Figure 3B:
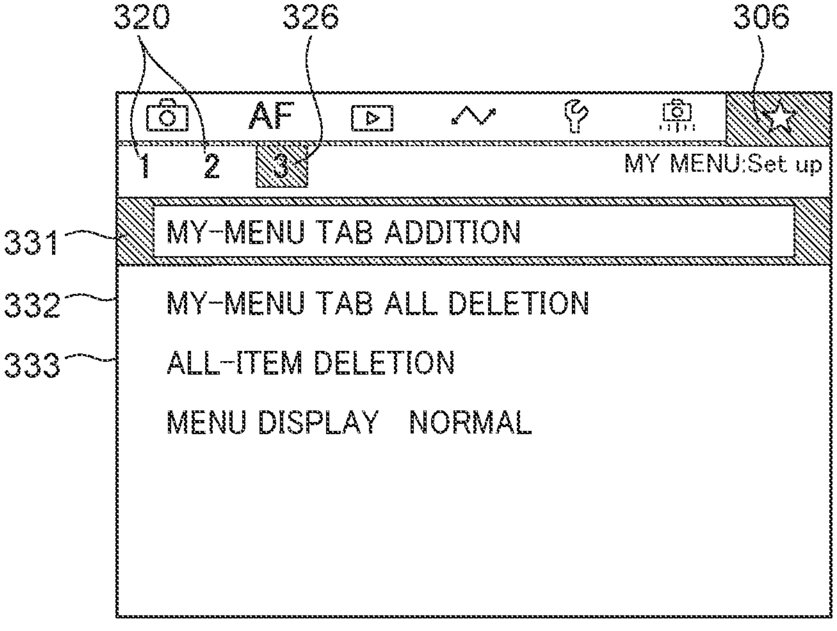
Figure 3C:
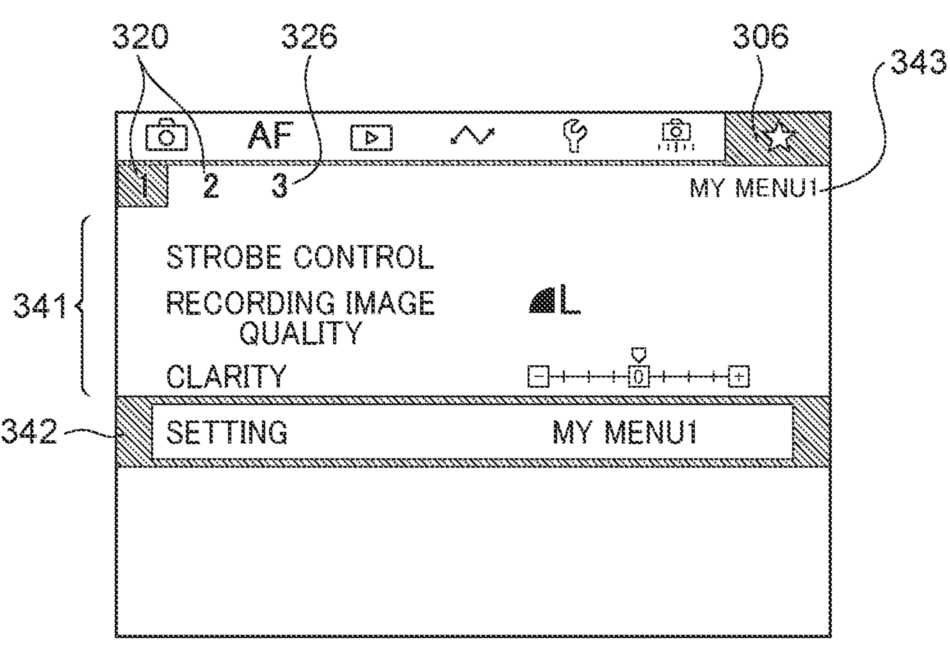

Next, the menu screen displayed on the liquid crystal monitor 27 of the camera 100 of the present embodiment will be described with reference to FIGS. 3A to 3F. FIGS. 3A, 3B, and 3C each show an example of the menu screen displayed on the liquid crystal monitor 27 when the menu button 75 (see FIG. 2) is pressed.

FIG. 3A shows an example of the menu screen displayed on the liquid crystal monitor 27 when the menu button 75 is pressed. Further, FIG. 3A shows an example displayed when a main tab other than a my-menu main tab 306 is selected and shows a state in which a photographing tab 300*a* is selected. As shown in FIG. 3A, tabs arranged in a horizontal line on top part of the screen are main tabs 300, and a main tab highlighted (hatched in FIGS. 3A to 3F), for example, by a color on the actual display screen indicates a main tab on which the focus is placed. In the present embodiment, the main tabs 300 include seven types, i.e. the photographing tab 300*a*, an AF tab 300*b*, a reproduction tab 300*c*, a communication function tab 300*d*, a function setting tab 300*e*, a custom function tab 300*f*, and a my-menu tab 300*g* (306). The photographing tab 300*a*, the AF tab 300*b*, the reproduction tab 300*c*, the communication function tab 300*d*, the function setting tab 300*e*, and the custom function tab 300*f* each are a main tab for displaying a setting menu screen on which menu items for making settings of the camera 100 are displayed. The main tabs are divided according to the category of menu items, and hence the user can easily reach a desired menu item to change the setting. The my-menu tab 300*g* (306) is a main tab for displaying a menu screen for my menu, on which only menu items registered by a user out of the menu items included in the setting menu screens each of which is to be displayed according to selection of the main tabs 300*a* to 300*f*. In a my-menu function, it is possible to display a plurality of menu items different in category (main tab), which are displayed on the setting menu screens, on a single my-menu screen, and the user can improve the operability by registering menu items which are frequently used, in the my-menu screen.

As indicated by the setting menu screen shown in FIG. 3A, sub tabs belonging to the selected main tab 300 (photographing tab 300*a*) are displayed in a list as sub tabs 307, and the sub tab 307 highlighted, for example, by a color on the actual display screen is a sub tab on which the focus is placed. The sub tabs 307 are arranged in a single horizontal line under the main tab 300. The number of sub tabs 307 belonging to the main tab 300 is different for each main tab 300. In FIG. 3A, menu items belonging to the sub tab 307 on which the focus is currently placed are displayed in a list as menu items 309, and a menu item highlighted, for example, by a color on the actual display screen is a menu item on which the focus is placed. Thus, in the present embodiment, since the number of menu items included in each main tab is large, the menu items are hierarchically displayed by providing sub tabs. The menu items for making settings of the camera 100 are hierarchically displayed according to categories and the like, whereby it is possible to reduce the number of steps of operation (the number of times of operation) required for reaching a desired menu item.

The focuses placed on the main tab 300, the sub tab 307, and the menu item 309, respectively, can be moved by a user operating the operation section 70. That is, selection of the main tab 300, the sub tab 307, and the menu item 309 can be changed by a user operating the operation section 70. The focus can be moved not only during the display of the setting menu screen as shown in FIG. 3A, but also during the display of the menu screen for my menu (see FIGS. 3B and 3C). The display of the main tab 300, the sub tab 307, and the menu item 309 is determined according to the setting of a photographing mode and a user operation.

FIGS. 3B and 3C are each the menu screen for my menu, which is a menu screen displayed when the focus is placed on the my-menu main tab 306 (300*g*). The my-menu main tab 306 has a my-menu setting tab 326 and my-menu tabs 320 as the sub tabs. As shown in FIG. 3*b*, a my-menu setting menu screen displayed when the my-menu setting tab 326 is selected includes menu items concerning the settings of the my menu (my-menu tab addition 331, my-menu tab all deletion 332, and all-item deletion 333). The my-menu setting menu screen displayed when the my-menu setting tab 326 is selected includes, differently from the menu screen displayed in a case where the my-menu tab 320 is selected, menu items which are associated with settings to be made with respect to the whole my-menu function. In the illustrated examples in FIGS. 3B and 3C, the two my-menu tabs 320 have been registered. The my-menu tab 320 can be added/deleted by a user operation, and an upper limit of the number of my-menu tabs 320 which can be added is determined in advance.

FIG. 3B shows the menu screen (my menu setting screen) displayed in a state in which the focus is placed on the my-menu setting tab 326. When the camera is in the initial state, no my-menu tab has been registered yet, and hence no my-menu tab 320 exists. To display the my-menu tab 320 from the above-described state, the user is required to select the menu item of the my-menu tab addition 331 in a state focused on the my-menu setting tab 326 and then press the set button to add a my-menu tab. The my-menu setting tab 326 is comprised of the my-menu tab addition 331, the my-menu tab all deletion 332, the all-item deletion 333, and so forth. Details of a process performed when a menu item is selected from these menu items and the set button is pressed will be described hereinafter with reference to FIG. 5. In the present embodiment, the display position of the my-menu setting tab 326 is always at the right end regardless of the number of my-menu tabs. The my-menu tabs 320 are displayed from the left in an order of addition of the my-menu tabs, and the numbers starting from 1 are sequentially displayed on sub tabs, respectively. Besides the numbers displayed on the respective sub tabs, a tab name is set for each my-menu tab 320.

FIG. 3C shows the menu screen (my-menu tab screen) displayed when the focus is placed on the leftmost sub tab on which “1” is displayed, out of the sub tabs of the my-menu tabs 320. When a my-menu tab 320 is selected, the tab name, denoted by reference numeral 343, of the selected my-menu tab 320 is displayed on the right side of the sub tab display field. Then, there are displayed menu items 341 having been registered in the selected my-menu tab, and an item of set 342. In the set 342, the my-menu tab name is also displayed so as to enable the user to know that the setting is associated with the selected my-menu tab. In FIG. 3C, as the menu items 341 registered in my-menu tab, menu items of strobe control, recording image quality, and clarity are displayed. When the user selects the set 342 and presses the set button 78, there is displayed a my-menu tab-setting screen shown in FIG. 3D, for performing setting related to the my-menu tab displayed at the time of operation of the set button 78.

Figure 3D:
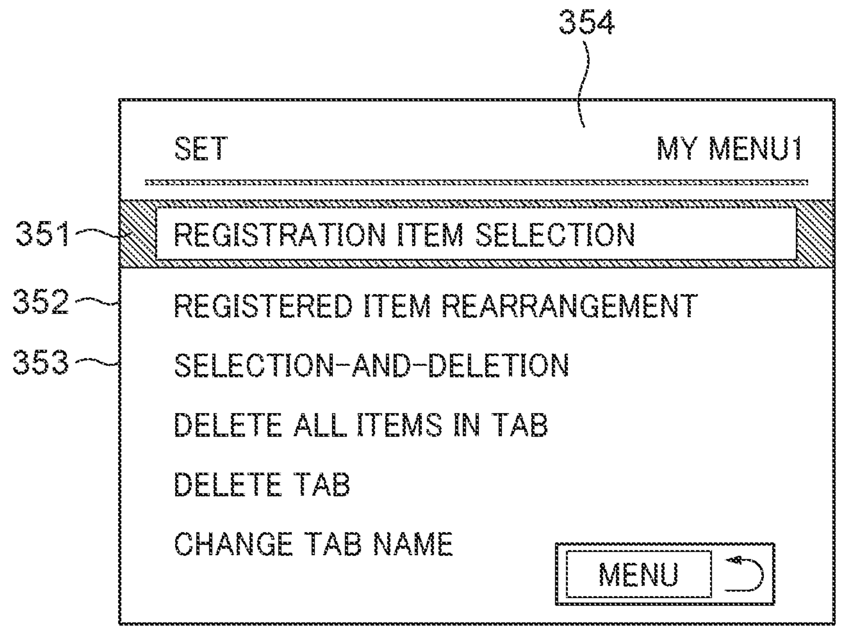

FIG. 3D shows the my-menu tab-setting screen for performing setting with respect to a my-menu tab to be processed. The my-menu tab-setting screen is comprised of the menu items of registration item selection 351, registered item rearrangement 352, selection-and-deletion 353, and so forth. Further, on the upper right corner of this screen, to make the user know a my-menu tab on which setting is performed, a tab name 354 of the my-menu tab to be processed is displayed. Details of the operation on the my-menu tab-setting screen will be described hereinafter with reference to FIG. 5.

Figure 3E:
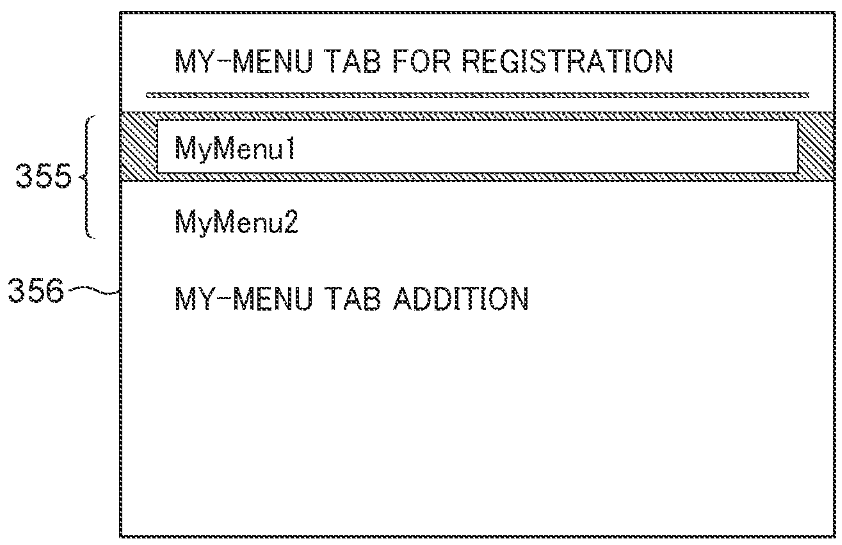

FIG. 3E shows a my-menu table selection screen for selecting a my-menu tab 320 in which a menu item is to be registered, in a registration process performed for directly registering a menu item on which the focus is placed on a setting menu screen in my-menu tab, without using the menu screen for my menu of which examples are shown FIGS. 3B and 3C. In the present embodiment, in a case where a menu item is registered in a my-menu tab, from the my-menu tab-setting screen of which an example is shown in FIG. 3D, the registration operation is performed after a my-menu tab 320 in which the menu item is to be registered is selected from sub tabs on the menu screen for my menu, and hence it is not necessary to display the my-menu table selection screen shown in FIG. 3E. The my-menu table selection screen shown in FIG. 3E includes the selection items of added my-menu tabs 355 (My Menu 1 and My Menu 2) and my-menu tab addition 356. The my-menu tab addition 356 is selected when the user adds a new my-menu tab.

Figure 3F:
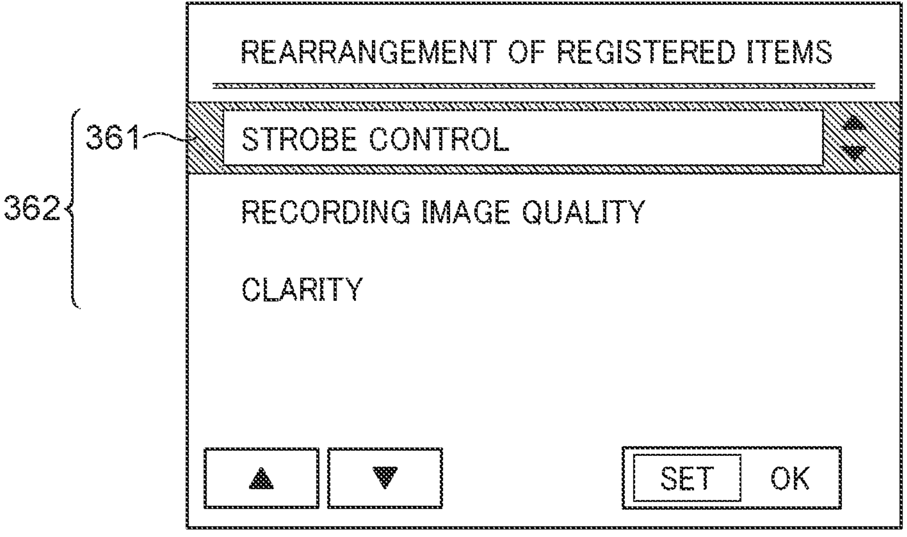

FIG. 3F shows a screen for rearranging registered items of the my-menu tab. This screen is a setting screen for rearranging the menu items registered in my-menu tab to be processed, and displays menu items 362 registered in my-menu tab to be processed, including a menu item 361 to be rearranged (changed in display position by rearrangement). It is possible to vertically move the position of the menu item 361 to a desired position, whereby it is possible to rearrange the registered menu items 362.

Figure 4:
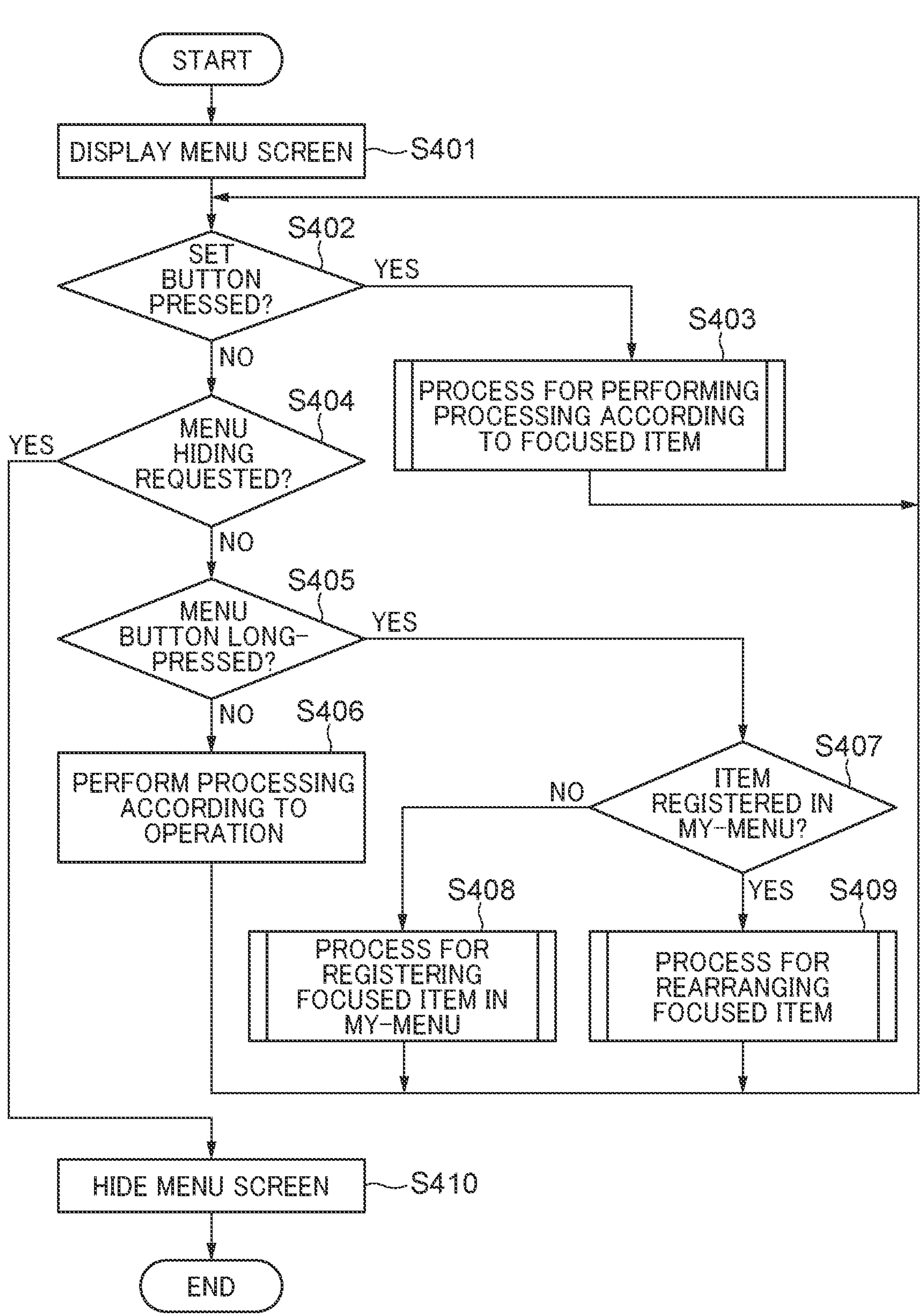
FIG. 4 is a flowchart of a process performed when a user performs an operation of displaying a menu in the embodiment of the present disclosure.

FIG. 4 is a flowchart of a menu screen-displaying operation process. When an instruction associated with a short pressing operation of the menu button 75, which is performed by the user, is received from the operation section 70, the present process is started. First, in a step 401 (step number is described as S401 and the same applies to the other steps), the system controller 50 displays a menu screen (such as the menu screen shown in FIG. 3A, 3B, or 3C) on the liquid crystal monitor 27. The menu screen is displayed in a state in which the focus is placed on each one of the main tabs 300, the sub tabs 307, and the menu items. As for the item selection state on the menu screen, the menu screen can be displayed in a selection state set when the menu screen was displayed last time or in a state in which predetermined items selected. That is, if the menu button 75 is short-pressed in a state in which the menu screen is not displayed, the setting menu screen as shown in FIG. 3A, the my menu setting screen as shown in FIG. 3B, or the my-menu tab screen as shown in FIG. 3C is displayed. Then, if it is determined in a step S402 that the system controller 50 has received an instruction associated with an operation of pressing the set button 78, which is performed by the user, from the operation section 70 (YES), the system controller 50 proceeds to a step S403. On the other hand, if the system controller 50 has not received this instruction (NO), the system controller 50 proceeds to a step S404.

In the step S403, the system controller 50 executes a process for performing processing according to each of the menu items (309, 331 to 333, 341, 342, and so forth) on which the focus is currently placed on the menu screen, and returns to the step S402. The process executed in the step S403 will be described hereinafter with reference to FIG. 5. On the other hand, if it is determined in the step S404 that a request for hiding the menu has been received, the system controller 50 proceeds to a step S410. Further, if a request for hiding the menu has not been received (NO), the system controller 50 proceeds to a step S405. The request for hiding the menu is performed by a reproduction request, a request for displaying an image capturing screen, an image capturing operation, an operation of pressing the menu button 75 (short pressing), or the like.

If it is determined in the step S405 that an instruction associated with a long pressing operation of the menu button 75, which is performed by the user, has been received from the operation section 70 (YES), the system controller 50 proceeds to a step S407. On the other hand, if an instruction associated with a long pressing operation of the menu button 75 has not been received (NO), the system controller 50 proceeds to a step S406. Then, in the step S406, the system controller 50 executes processing on the menu screen, according to another user operation, and returns to the step S402. The processing according to the other user operation is processing according to an operation other than the operation of pressing the set button 78 (S403), the operation of performing the menu hiding request (S404), and the long pressing operation of the menu button (S405). The processing according to the other user operation further includes processing for moving the focus on a main tab, a sub tab, and a menu item (changing selection of the menu item), which is performed, for example, by operating the four-direction buttons. In the processing for moving the focus, the system controller 50 moves the focus in response to an operation performed with respect to the operation section 70. In a case where selection of the main tab is changed by moving the focus on the main tab, the menu screen is displayed in a state in which the sub tabs and the menu items are changed to those associated with the selected main tab. Further, in a case where selection of the sub tab is changed by moving the focus on the sub tab, the display is switched to the display of the menu items associated with the selected sub tab.

Further, the processing executed in the step S406, which is performed in response to the other user operation during the display of the menu screen, includes displaying a quick setting customization screen in response to a long pressing operation of the Q button 76 and displaying a button customization-setting screen in response to a long pressing operation of the My-Fn button 77, which will be described below.

When the user presses the Q button 76 on the image capturing screen (photographing standby screen), the system controller 50 displays the quick setting screen on the liquid crystal monitor 27. The quick setting screen displays an icon corresponding to a menu item set by the user on the quick setting customization screen in a state superimposed on the live view image, which enables the user to confirm the live view image and easily change the setting of the menu item by operating the icon. Then, when the user long-presses the same Q button 76 on the menu screen, the system controller 50 changes the display to the quick setting customization screen for registering a menu item being focused on the menu screen, in the quick setting screen. Here, the system controller 50 displays the quick setting customization screen in a state in which items related to the menu item being focused on the menu screen are selected as the items to be displayed on the quick setting screen.

Further, when the user short-presses the My-Fn button 77 in a state in which a function has been registered in the My-Fn button 77, the system controller 50 executes the function registered in the My-Fn button 77. When the user short-presses the My-Fn button 77 in a state in which no function has been registered in the My-Fn button 77, the system controller 50 displays the button customization-setting screen for registering a function to be executed when the My-Fn button 77 is operated. Then, when the user long-presses the same My-Fn button 77 during the display of the menu screen, the system controller 50 displays the button customization-setting screen for registering a function corresponding to the focused menu item in the My-Fn button 77. Note that the system controller 50 displays the button customization-setting screen in a state in which the function corresponding to the menu item being focused on the menu screen is selected for the My-Fn button 77.

Further, the system controller 50 displays, on the liquid crystal monitor 27, a guidance for recommending the use of my menu, quick setting, and button customization to a user who performs the same setting many times. Specifically, the system controller 50 prepares a counter for each menu item, counts the number of times of shifts to the menu item, and displays the guidance on the liquid crystal monitor 27 when the number of times of shifting to the menu item reaches a predetermined number of times or more. That is, the system controller 50 functions as a counting section that counts how many times setting has been performed for each setting item, and in a case where it is determined by the counter that setting has been performed a predetermined number of times or more with respect to the menu item, the system controller 50 operates as described above: The system controller 50 can be configured to provide a notification for prompting a user to register a menu item in a my-menu tab by long pressing the menu button 75 during the display of the menu.

If it is determined in the step S405 that the menu button has been long-pressed (YES), in the step S407, the system controller 50 determines whether or not the focused menu item is one of the menu items 341 registered in the my-menu tab, which are to be displayed on the menu screen displayed when the my-menu main tab 306 is selected and also the my-menu tab 320 is selected. If the focused menu item is one of the menu items 341 registered in my-menu tab (YES), the system controller 50 proceeds to a step S409. On the other hand, if the menu item is a menu item (one of the menu items 309 displayed on the setting menu screen) other than the menu items registered in my-menu tab (NO), the system controller 50 proceeds to a step S408. In the step S408, since the user has long-pressed the menu button 75 with respect to a menu item other than the my-menu tab 320, the system controller 50 performs a process for registering the focused menu item in my menu, and then proceeds to the step S402. The process for registering the focused menu item in my menu in the step S408 will be described hereinafter with reference to FIG. 6.

Further, in the step S409, since the user has long-pressed the menu button 75 with respect to the menu item displayed (registered) in the my-menu tab 320, the system controller 50 performs a process for rearranging the focused item registered in my menu and returns to the step S402. The process for rearranging the focused menu item in the step S409 will be described hereinafter with reference to FIG. 7. Then, in the step S410, the system controller 50 hides the menu screen (see FIG. 3A) on the liquid crystal monitor 27, followed by terminating the present process.

Although in the present embodiment, the system controller 50 changes the process according to a result of the determination in the step S407, the system controller 50 can be configured to perform the process for registering the focused menu item in the my menu in the step S408 without executing the determination in the step S407. Further, in a case where the focused menu item is one of the menu items 331 to 333 on the my menu setting screen or the my-menu tab setting 342, the menu item cannot be registered in my-menu tab, and hence the process returns to the step S402 without executing the step S408. Further, in the process in the step S409, whether to register the focused menu item of my menu or rearrange the menu items can be determined by the user. The operation performed with respect to the menu item of my menu can include not only registration and rearrangement, but also deletion of a menu item and deletion of a tab from the my menu. Thus, according to the present embodiment, it is possible to easily register a menu item being selected in the my-menu screen (my-menu tab) by performing not the normal short pressing operation but the long pressing operation of the menu button for switching between the displaying and the hiding of the menu screen during the display of the menu screen.

Figure 5:
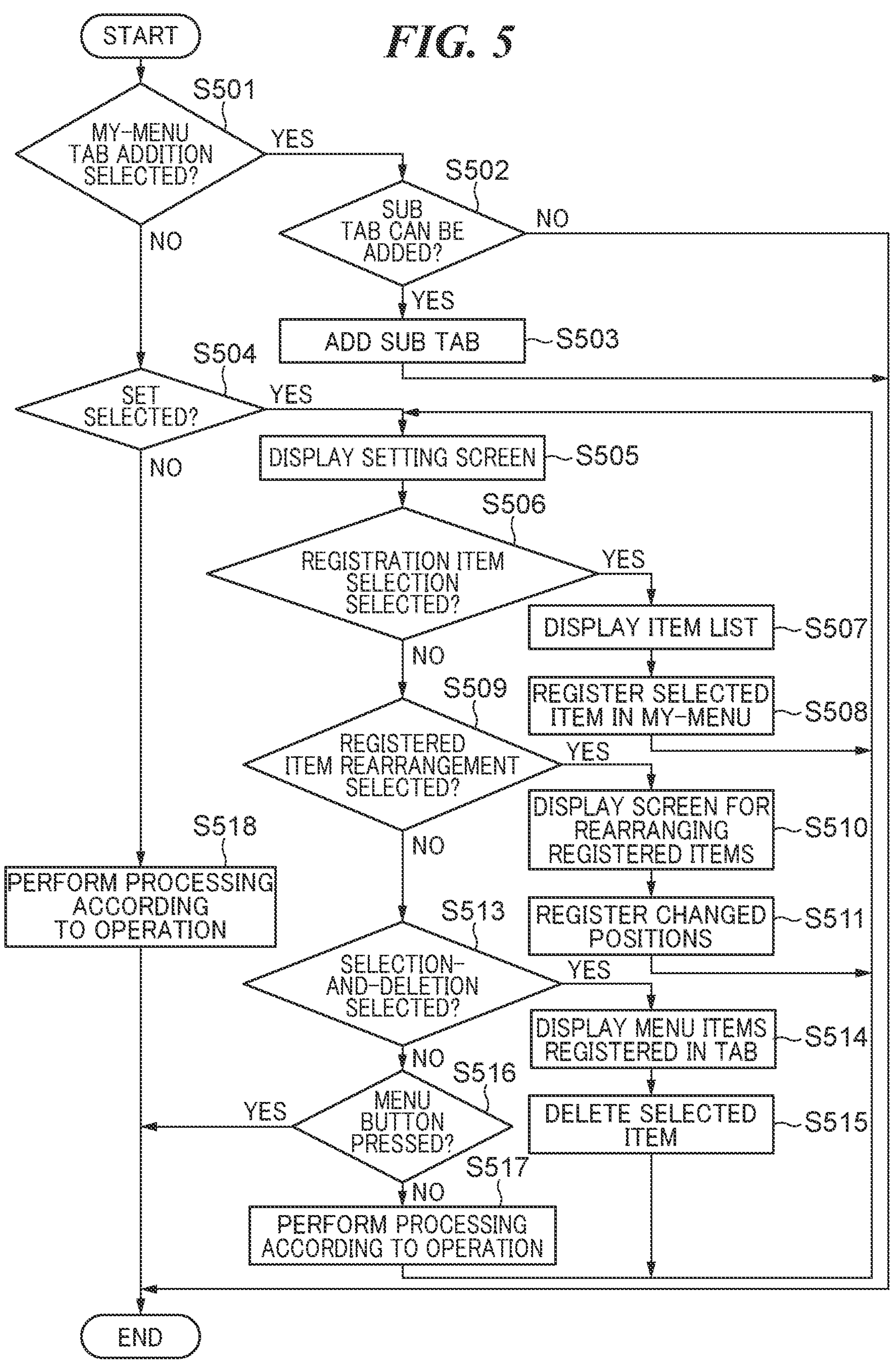
FIG. 5 is a flowchart of a process for performing processing according to a focused item in the embodiment of the present disclosure.

FIG. 5 is a flowchart of the process for performing processing according to the focused item, which is performed when the set button is pressed in the step S403 in the process in FIG. 4. Here, particularly, the description is given mainly of the process for performing processing according to the my menu setting on the my-menu screen, and description of other processing is omitted. In a step S501, the system controller 50 determines whether or not the menu item being focused (selected) at the time of pressing the set button is the my-menu tab addition 331 on the my menu setting screen. If it is determined that the selected menu item is the my-menu tab addition 331 (YES), the system controller 50 proceeds to a step S502. On the other hand, if it is determined that the selected menu item is not the my-menu tab addition 331 (NO), the system controller 50 proceeds to a step S504.

In the step S502, the system controller 50 determines whether or not a my-menu tab (sub tab) can be added, and if a my-menu tab can be added (YES), the system controller 50 proceeds to a step S503. On the other hand, if it is determined that no my-menu tab can be added due to such a reason that the my-menu tabs have been added up to the maximum number (NO), the system controller 50 notifies the user of this fact by using, for example, a warning, followed by terminating the present process. In the step S503, the system controller 50 adds one my-menu tab, followed by terminating the present process.

In the step S504, if a menu item focused (selected) at the time of pressing the set button is the set 342 on the my-menu tab screen (see FIG. 3) (YES), the system controller 50 proceeds to a step S505. On the other hand, if the selected menu item is not the set 342 (NO), the system controller 50 proceeds to a step S518. The step S518 will be described hereinafter. In the step S505, the system controller 50 displays the my-menu tab-setting screen (see FIG. 3D) on which a my-menu tab being selected is set as an object to be processed (to be set), on the liquid crystal monitor 27. In the steps S505 to S511 and S513 to S517, the setting process for performing processing according to the my-menu tab as the target to be set is performed.

In a step S506, the system controller 50 determines whether or not the registration item selection 351 has been selected by pressing the set button while the registration item selection 351 (see FIG. 3D) on the my menu-setting screen is being selected, and if the registration item selection 351 has been selected (YES), the system controller 50 proceeds to a step S507. If the registration item selection 351 has not been selected (NO), the system controller 50 proceeds to a step S509. In the step S507, the system controller 50 displays an item list which is a list of menu items which can be registered in my-menu tab as a target to be set. In the item list, all of the menu items included in the main tabs 300*a* to 300*f* are displayed in a list. At this time, all of the menu items are displayed in the list without coloring them or sorting them by the tabs. Therefore, in this item list, in a case where the user selects a desired item, it is more difficult to select the desired menu item than in a case where the menu item is selected by using a main tab and a sub tab on a hierarchized setting menu screen. In the item list, menu items already registered in a my-menu tab as the target to be set can be displayed in a grayed-out state. Then, in the step S508, the system controller 50 additionally registers a menu item selected by the user from the item list displayed in the step S507 in the my-menu tab as the target to be set. After that, the system controller 50 terminates the registration item selection processing and returns to the step S505 (in which the my-menu tab-setting screen is displayed).

In the step S509, the system controller 50 determines whether or not the registered item rearrangement 352 has been selected by pressing the set button while the registered item rearrangement 352 is being focused, and if the registered item rearrangement 352 has been selected (YES), the system controller 50 proceeds to a step S510. On the other hand, if the registered item rearrangement 352 has not been selected (NO), the system controller 50 proceeds to a step S513. In the step S510, the system controller 50 displays the registered item rearrangement screen (see FIG. 3F) for rearranging the menu items registered in the my-menu tab as the target to be set. Then, in the step S511, the system controller 50 changes the arrangement order of the menu items 341 to an arrangement order changed by the user on the registered item rearrangement screen. Although in the present embodiment, the rearrangement is performed only in the selected my-menu tab, a registered menu item can be made movable to another tab. After that, the system controller 50 terminates the registration item selection process and returns to the step S505 (in which the my-menu tab-setting screen is displayed).

In the step S513, the system controller 50 determines whether or not the selection-and-deletion 353 has been selected by pressing the set button while the selection and deletion 353 is being selected on the my menu-setting screen, and if the selection-and-deletion 353 has been selected (YES), the system controller 50 proceeds to a step S514. On the other hand, if the selection-and-deletion 353 has not been selected (NO), the system controller 50 proceeds to a step S516. In the step S514, the system controller 50 displays a registered item list as a list of the menu items 341 which have already been registered in the my-menu tab as the target to be set. Then, in the step S515, the system controller 50 deletes the menu item selected by the user on the registered item list from the my-menu tab as the target to be set.

In the step S516, the system controller 50 determines whether or not the menu button 75 has been pressed, and if the menu button 75 has been pressed (YES), the system controller 50 terminates the display of the my-menu tab-setting screen, returns the display to the menu screen, terminates the present process, and returns to the step S402 in the process in FIG. 4. If the menu button 75 has not been pressed (NO), the system controller 50 proceeds to a step S517.

In the step S517, the system controller 50 executes, in response to a user operation other than the operations in the steps S506, S509, S513, and S516, processing according to the user operation, and returns to the step S505. In the step S518, the system controller 50 performs processing according to the menu item focused (selected) at the time of pressing the set button, followed by terminating the present process. For example, in a case where the selected menu item is a menu item on the setting menu screen, the system controller 50 executes processing, for example, for changing the setting of the menu item. After that, the system controller 50 terminates the present process and returns to the step S402 in the process in FIG. 4.

Figure 6:
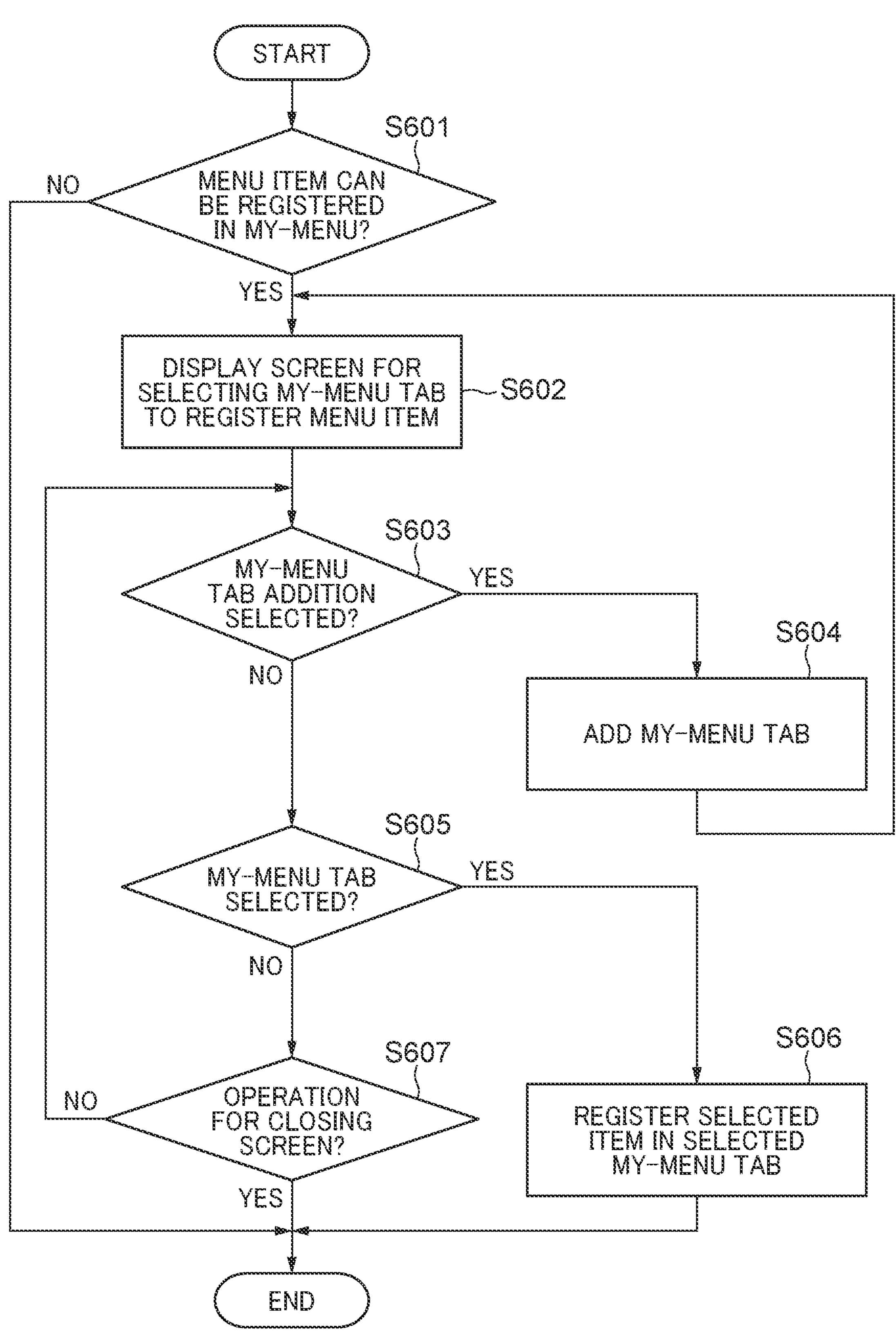
FIG. 6 is a flowchart of a process for registering a focused item in my menu in the embodiment of the present disclosure.

FIG. 6 is a flowchart of the registration process for registering a focused item in my menu, which is executed when the menu button is long-pressed on the setting menu screen in the step S408 in the process in FIG. 4. In a step S601, the system controller 50 determines whether or not the menu item can be registered in my menu, and if it is determined that the menu item can be registered (YES), the system controller 50 proceeds to a step S602. On the other hand, if it is determined that the menu item cannot be registered (NO), the system controller 50 terminates the present process. Next, in the step S602, the system controller 50 displays the selection screen displaying a list of my-menu tabs in which a menu item can be registered, for selecting a my-menu tab to register the menu item (see FIG. 3E), If it is determined in a step S603 that the my-menu tab addition 356 has been selected on the selection screen for selecting a my-menu tab to register the menu item (YES), the system controller 50 proceeds to a step S604. On the other hand, if the my-menu tab addition 356 has not been selected (NO), the system controller 50 proceeds to a step S605. In the step S604, the system controller 50 adds a my-menu tab (adds a sub tab) and returns to the step S602, and in the step S602, the system controller 50 displays the selection screen to which the my-menu tab added in the step S604 has been added as a menu option, for selecting a my-menu tab to register the menu item. In the step S605, the system controller 50 determines whether or not one of the my-menu tabs 351 already added has been selected, if it is determined in the step S605 that one of the my-menu tabs 351 has been selected (YES), the system controller 50 proceeds to a step S606. On the other hand, if none of the my-menu tabs 351 have been selected (NO), the system controller 50 proceeds to a step S607.

In the step S606, the system controller 50 registers the menu item focused when the instruction performed by the long pressing of the menu button 70 has been received from the operation section 70 in the step S405, in the my-menu tab selected in the step S605.

In the step S607, the system controller 50 determines whether or not an operation of closing the present screen (see FIG. 3E) has been performed, and if it is determined that the operation of closing the screen has been performed (YES), the system controller 50 terminates the present process, returns the display to the menu screen, and returns to the step S402 in the process in FIG. 4. If it is determined that the process is not to be terminated (NO), the system controller 50 returns to the step S603. In the present embodiment, the user selects a my-menu tab to register a menu item from the my-menu tabs already added. However, a my-menu tab to register a menu item can be automatically determined by the system controller 50 without causing the user to select a my-menu tab to register a menu item. For example, in a case where only one my-menu tab has been added, the system controller 50 registers the menu item in the one my-menu tab already added without displaying the selection screen for prompting the user to select a my-menu tab to register the menu item. Further, in a case where there are a plurality of my-menu tabs already added, the selection screen for selecting a my-menu tab to register the menu item can be displayed to prompt the user to select a my-menu tab. Further, the menu item can be added to all my-menu tabs in which the menu item can be added. Further, the system controller 50 can be configured to display the registered menu items 341 belonging to the selected my-menu tab on the liquid crystal monitor 27 as reference information.

Figure 7:
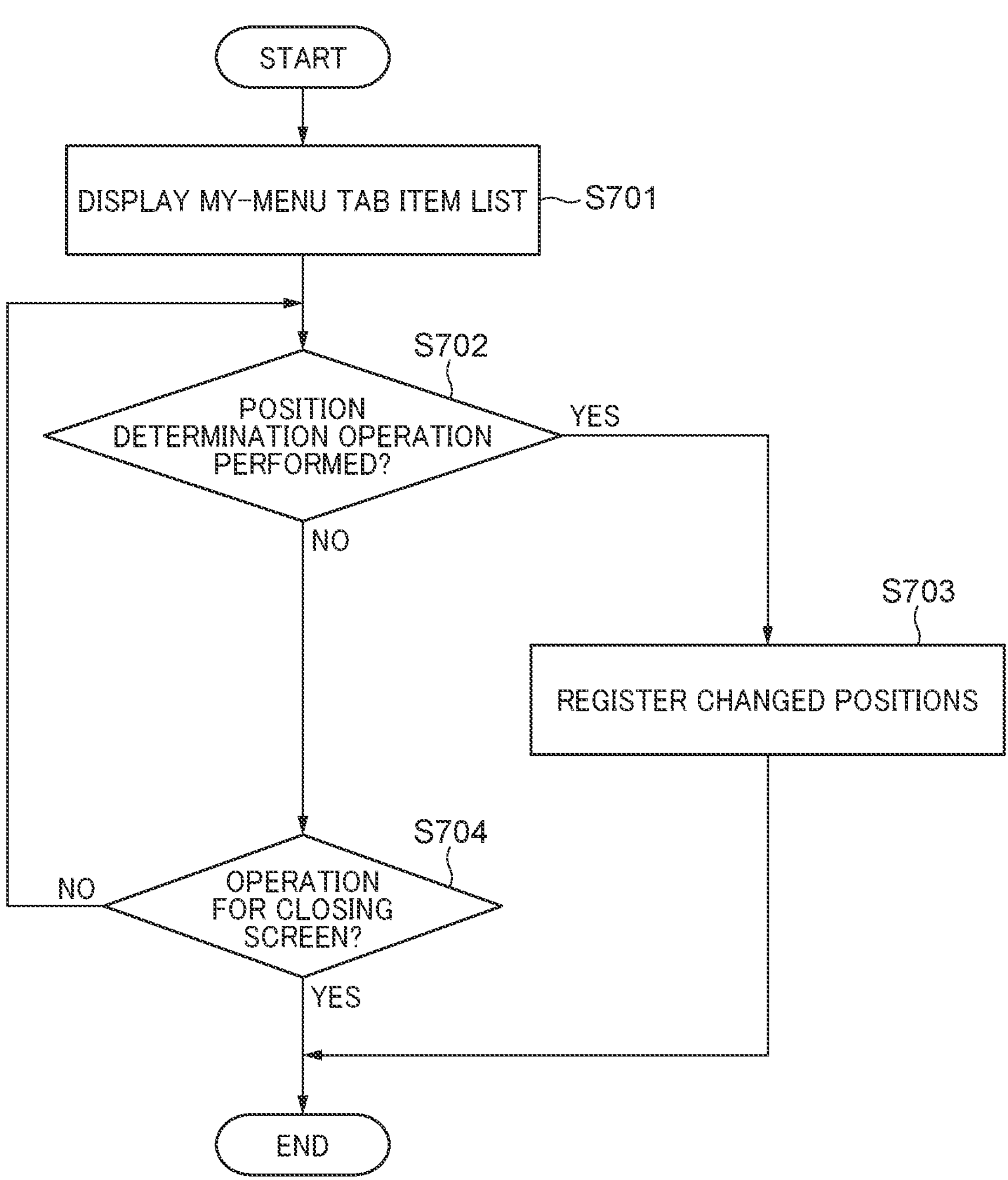
FIG. 7 is a flowchart of a process for rearranging a focused item in the embodiment of the present disclosure.

FIG. 7 is a flowchart of the process performed in the step S409 in the process in FIG. 4, for rearranging the focused item. First, in a step S701, when an instruction associated with the long pressing operation of the menu button 75, which is performed by the user, has been received from the operation section 70 in the step S405, the system controller 50 displays the registered menu items 341. At this time, in a case the instruction associated with the long pressing operation of the menu button 75 by the user has been received from the operation section 70 in the step S405, the system controller 50 sets the display to a state in which the focused menu item is selected as the menu item 361 to be rearranged (see FIG. 3F).

Next, in a step S702, the system controller 50 determines whether or not a position determining operation of finally determining the position of the menu item has been performed by the user, and if it is determined that the position determining operation has been performed (YES), the system controller 50 proceeds to a step S703. On the other hand, if the position determining operation has not been performed (NO), the system controller 50 proceeds to a step S704. In the step S703, the system controller 50 updates the arrangement order of the registered menu items 341 by registering the target menu item in the position changed by the user, followed by terminating the present process. In the step S704, the system controller 50 determines whether or not an operation for closing the present screen has been performed by the user, and if it is determined that the operation has been performed (YES), the system controller 50 terminates the present process.

On the other hand, if it is determined in the step S704 that the operation for closing the present screen has not been performed by the user (NO), the system controller 50 returns to the step S702. As described above, the system controller 50 can be provided with a rearranging section that rearranges menu items of the registered my menu (My Menu: second setting item group) based on the long pressing operation of the menu button 75.

Note that the system controller 50 can call registered contents, which have been newly registered, in response to the respective long pressing operation of the buttons 75, 76, and 77 with respect to the My-menu screen, the LVQ screen, and a button customization screen, and display the contents on the liquid crystal monitor 27.

With reference to FIGS. 3 to 7, the description has been given of the process for easily registering a menu item being selected, in my menu, in response to the long pressing operation of an associated button, particularly, mainly of registration of a menu item in the my-menu screen. This process can be similarly executed also with respect to the LVQ registration screen and the button customization registration screen.

On the setting menu screen, the menu items are hierarchically arranged for each category (main tab) and each menu item group (sub tab), which enables a user to easily select a menu item and hence is user-friendly. On the other hand, in a case where a menu item is registered in a my-menu tab from the registration item selection 351 on the my-menu tab-setting screen shown in FIG. 3D, the menu items are not displayed in the hierarchical arrangement, and hence it is difficult to select a menu item. As in the present embodiment, if a user selects a menu item on the setting menu screen which is hierarchically displayed, and registers the selected menu item by long pressing the menu button, it is possible to easily select a menu item to be registered in the my menu. Further, it is possible to register a menu item in my menu with an intuitive and simple operation without selecting the my-menu tab-setting screen or using the registration item selection 351.

As described above, according to the present disclosure, the display controller performs control to display a first display screen for displaying a first setting item group or a second display screen for displaying a second setting item group which is part of the items of the first setting item group on the display. Further, the selection section selects an item from the first setting item group on the first display screen. The controller executes the registration process for registering the item selected by the selection section in the second setting item group, in response to a first operation performed during the display of the first display screen.

According to the above-described embodiment, although the description has been given of the example of the configuration in which a plurality of my-menu tabs exist, the number of my-menu tabs can be limited to one, and the menu items of my menu can be displayed by scrolling. Further, a touch panel which can detect a touch on the liquid crystal monitor 27 can be provided as one of the components of the operation section 70 so as to enable a user to register a desired menu item in my menu by touching the menu item. In this case, the touch operation performed to register a menu item in my menu can be a long touch operation, a drag operation, a double-tap operation or the like, which is different from a normal tap operation for selecting a menu item. Further, the registration screen used in this case can be one suitable for the touch operation, such as a display device having both of the display function and the touch panel, differently from the above-described screens.

Further, the system controller 50 can be configured to further include a touch panel that can detect a touch operation. In this case, the system controller 50 can be configured not to call the registered my menu when a touch operation or a touch-and-hold operation performed with respect to the setting item is detected during the display of the menu.

Further, by enabling the communication section 54 provided in the camera 100 and a mobile terminal to communicate predetermined information with each other, and a user installs an application downloaded from a specific site. When this application is started, if a variety of setting items displayed on the liquid crystal monitor 27 are displayed on a screen of the mobile terminal, this enables the user other than the owner of the camera as well to know the displayed contents. Further, for example, the setting item group can be selected on the mobile terminal by using this application, and the system controller 50 can cause the camera to register the selected my menu via the communication section 54. Further, the electronic apparatus according to the present disclosure is not limited to the camera, insofar as it has a lot of setting items, and is capable of registering, for example, a favorite setting item in my menu.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-014558, filed Feb. 2, 2023, which is hereby incorporated by reference herein in its entirety.

What is claimed is:

1. An electronic apparatus comprising:
one or more processors; and
at least one memory storing one or more programs including instructions, which when executed by the one or more processors, cause the electronic apparatus to:
perform control to display a first display screen for displaying a first setting item group or a second display screen for displaying a second setting item group which is part of items of the first setting item group, on a display;
select an item from the first setting item group on the first display screen; and
execute a registration process for registering an item selected in the second setting item group in response to a first operation performed during the display of the first display screen,
wherein the first operation is an operation of long pressing a first operation member, for displaying the first display screen or the second display screen, and
wherein the instructions, when executed by the one or more processors, cause the electronic apparatus to perform control to switch between displaying and hiding of the first display screen or the second display screen in response to an operation of short pressing the first operation member.

2. The electronic apparatus according to claim 1, wherein a plurality of second setting item groups can be registered as the second setting item group, and
wherein the instructions, when executed by the one or more processors, cause the electronic apparatus to perform control to display one of the plurality of second setting item groups on the second display screen.

3. The electronic apparatus according to claim 2, wherein the instructions, when executed by the one or more processors, cause the electronic apparatus to switch the second setting item group to be displayed on the second display screen between the plurality of second setting item groups, in response to a user operation.

4. The electronic apparatus according to claim 2, wherein the instructions, when executed by the one or more processors, cause the electronic apparatus to, in the registration process, perform control to prompt a user to select a second setting item group to register an item selected from the plurality of second setting item groups and register the item selected in the selected second setting item group.

5. The electronic apparatus according to claim 4, wherein the instructions, when executed by the one or more processors, cause the electronic apparatus to, in a case where there is only one second setting item group, register, in the registration process, an item selected in the one second setting item group without prompting a user to select a second setting item group to register an item.

6. The electronic apparatus according to claim 1, wherein on the first display screen, the first setting item group is hierarchically displayed.

7. The electronic apparatus according to claim 6, wherein the instructions, when executed by the one or more processors, further cause the electronic apparatus to execute a process for registering, in the second setting item group, an item selected on a selection screen which is different from the first display screen and is for selecting from the first setting item group an item to be registered in the second setting item group, and
wherein on the selection screen, the first setting item group is displayed without being hierarchized.

8. The electronic apparatus according to claim 1, wherein the instructions, when executed by the one or more processors, cause the electronic apparatus to perform control to execute a second registration process, which is different from the registration process and is for registering an item selected by as an item to be displayed on a third display screen, in response to a second operation performed during the display of the first display screen.

9. The electronic apparatus according to claim 8, wherein the second operation is an operation of long pressing a second operation member, for displaying the third display screen, and
wherein the instructions, when executed by the one or more processors, cause the electronic apparatus to perform control to display the third display screen in response to an operation of short pressing the second operation member.

10. The electronic apparatus according to claim 1, wherein the instructions, when executed by the one or more processors, cause the electronic apparatus to perform control to execute a third registration process different from the registration process in response to a third operation performed during the display of the first display screen.

11. The electronic apparatus according to claim 10, wherein the third registration process is a process for registering processing associated with an item selected as processing to be executed in response to an operation of short pressing a third operation member, and
wherein the third operation is an operation of long pressing the third operation member.

12. The electronic apparatus according to claim 1, wherein the electronic apparatus is an image capturing apparatus including an image capturing unit,
wherein the first display screen is a setting menu screen for changing settings of the image capturing apparatus, and
wherein the second display screen is a my-menu screen.

13. A method of controlling an electronic apparatus, the method comprising:
performing control to display a first display screen for displaying a first setting item group or a second display screen for displaying a second setting item group which is part of items of the first setting item group on a display;
selecting an item from the first setting item group on the first display screen; and
executing a registration process for registering an item selected in the second setting item group in response to a first operation performed during the display of the first display screen,
wherein the first operation is an operation of long pressing a first operation member, for displaying the first display screen or the second display screen, and
wherein performing the control to display the first display screen or the second display screen on the display includes performing control to switch between displaying and hiding of the first display screen or the second display screen in response to an operation of short pressing the first operation member.

14. A non-transitory computer-readable storage medium storing a program for causing a computer to execute a method of controlling an electronic apparatus, wherein the method comprises:

performing control to display a first display screen for displaying a first setting item group or a second display screen for displaying a second setting item group which is part of items of the first setting item group on a display;

selecting an item from the first setting item group on the first display screen; and executing a registration process for registering an item selected in the second setting item group in response to a first operation performed during the display of the first display screen, wherein the first operation is an operation of long pressing a first operation member, for displaying the first display screen or the second display screen, and wherein performing the control to display the first display screen or the second display screen on the display includes performing control to switch between displaying and hiding of the first display screen or the second display screen in response to an operation of short pressing the first operation member.

* * * * *